Feb. 14, 1961 M. MOSNÝ ET AL 2,972,041
DEVICE FOR CONTROLLING THE LEVEL OF MOLTEN SLAG
Filed May 14, 1958
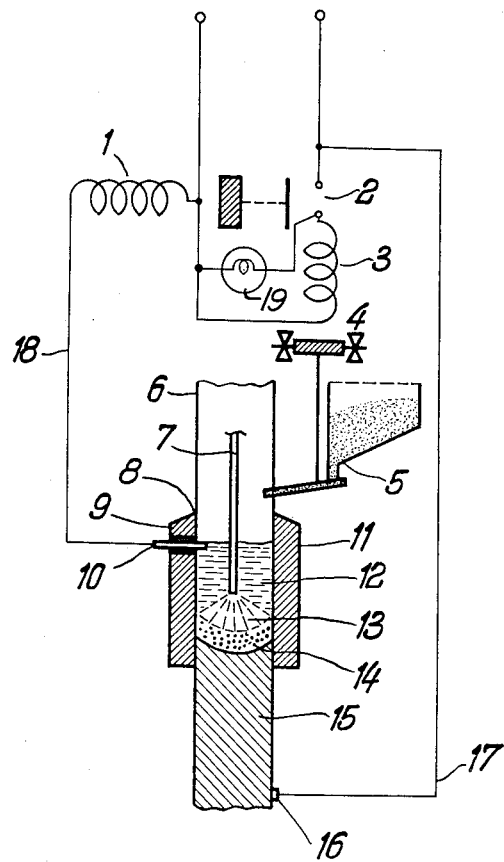
Inventors
Martin Mosný, Viliam Pavelka
By Richard [signature]

United States Patent Office 2,972,041
Patented Feb. 14, 1961

2,972,041
DEVICE FOR CONTROLLING THE LEVEL OF MOLTEN SLAG

Martin Mosný, 14 Zahradnicka, and Viliam Pavelka, 9 Jeruzalemska, both of Bratislava, Czechoslovakia Filed May 14, 1958, Ser. No. 735,325

Claims priority, application Czechoslovakia May 18, 1957

7 Claims. (Cl. 219—73)

This invention relates to the device for controlling the level of molten slag above the molten weld metal during automatic electrical welding in a bath of molten slag.

Automatic electrical welding in a bath of molten slag on vertical or inclined surfaces is usually carried out with a welding machine that automatically feeds one end of the welding wire to the weld, with that end of the welding wire being immersed in molten slag covering the molten weld metal, which, therefore, is protected against the influence of the atmosphere. A special cooling device, usually cooled by flowing water, prevents the molten weld metal and slag from escaping sideways from the welding bath. The welding machine, which feeds the welding wire into the welding bath, moves upwards as the formation of the weld proceeds, thus following the upward movement of the welding bath.

This welding method requires that the level of molten weld metal be continuously covered with molten slag formed of the flux. Further, the layer of molten slag must always be sufficiently deep, that is, there must be an adequate distance between the level of molten slag and the level of molten weld metal, and this distance must be maintained during the complete welding process.

In case the depth of the layer or bath of molten slag sinks below a critical minimum, various troubles may occur, for instance, the electric arc may emerge from the molten slag and continue to burn in free atmosphere. Troubles of this kind produce such detrimental effects upon the welding process, that the latter usually must be interrupted.

Up to now, the control of molten slag level has always involved human intervention. As a rule, one operator visually checked the level of molten slag, and simultaneously controlled the pouring-in of powdered flux. Alternatively, the flux was poured-in periodically at equal intervals. Both methods are clearly unsatisfactory. Checking the level of molten slag from above does not allow the operator to ascertain reliably the depth of the molten slag layer. When the flux is periodically poured-in, the pouring cycle has to be related to the variable speed of welding, and this condition practically can never be fulfilled. Therefore, the depth of molten slag may frequently sink below the critical minimum, and this invariably leads to faults in the welded joints and often may even interrupt the whole welding process. It should be noted that the minimum admissible distance between the level of molten slag and that of molten weld metal is approximately 30 millimeters.

The object of the present invention is to provide for the fully automatic control of the level of molten slag relative to the level of molten metal in the course of the welding process, and further to secure the suitably timed, intermittent pouring of flux into the welding bath by indicating the dropping of the molten slag level to or below the admissible minimum.

Another object of this invention is to provide not only the automatic control of the molten slag level, but also the automatic pouring of the flux into the molten slag for the purpose of keeping the level of molten slag at a predetermined height above the level of molten weld metal and thus to eliminate the above described faults inherent in the existing methods of welding.

The main feature of the present invention is the provision of an auxiliary electrical circuit for controlling the level of molten slag. This auxiliary electrical circuit is functionally independent from the main electrical circuit used for welding. Included in this auxiliary electrical circuit is a probe adapted to make electrical contact with the molten slag produced from the flux. The flux itself, in solid state, is electrically non-conductive. The probe is either cooled by water, or it is made from a material, for example, tungsten, which is unaffected by the temperatures existing in the welding bath. The probe is electrically insulated from the body of the welding machine, but it is mechanically connected to the latter in such a manner that it follows the upward motion of the welding machine in the course of the welding process. For instance, the probe may be placed in or on one of the cooling side-plates so as to move upwardly with the side-plate, while its distance above the level of molten weld metal remains unchanged. The free end of the probe extends into the space between both pieces to be welded together. As the welding continues, this free end of the probe is always a predetermined distance above the level of molten weld metal. This distance must be greater than, or at least equal to, the minimum admissible depth of the slag layer necessary for reliable welding, for instance, 30 millimeters. Thus, in the course of welding, the free end of the probe makes electrical contact with the molten slag and, consequently, closes the auxiliary circuit so long as the depth of the slag layer is greater than, or at least equal to, the allowed minimum. On the contrary, as soon as the slag level sinks below the free end of the probe, the electrical contact between the probe and molten slag is interrupted, whereby the auxiliary electrical circuit opens. This auxiliary electrical circuit further includes an appropriate known signalling or control device. This device may consist, for instance, of a visual or acoustical signalling apparatus, operated in response to opening of the auxiliary electrical circuit and which is rendered inoperative when the auxiliary electrical circuit is again closed.

As an additional improvement, the auxiliary circuit may include a switch, relay or similar contact-making device, which, at the instant when the auxiliary circuit is interrupted, initiates the operation of a flux-pouring mechanism, and then continues the operation of such mechanism until the auxiliary electrical circuit is again closed.

One example of a device for controlling the level of molten slag in accordance with the present invention is hereinafter described in detail with reference to the accompanying drawing containg a diagrammatic sectional view of the device.

The welding current flows through the welding wire 7. The lower end of wire 7 is immersed in molten slag 12 which is contained in the space above the solid weld metal 15 between the pieces 6 (only one of which appears in the drawing) which are to be welded together and between side plates 8 and 11 which span the gap between the pieces 6 and move upwardly as the welding proceeds. The welding current flows from the lower end of welding wire 7 towards the welded metal, and creates a highly ionized zone 13, in which excessive heat is developed. This heat causes the electrode 7 to melt and form a layer of weld metal 14, which gradually freezes, thus forming the zone of solid weld metal 15. The side plates 8 and 11 covering the opposite sides of the gap between welded parts 6 are cooled by water or other cooling medium. One of these side-plates carries the probe 10, which is held in position by an appropriate insulating sleeve 9 with its free end protruding into the gap between both welded pieces 6. The opposite or outer end of the probe is connected by a wire 18 to one end of the coil 1 of a relay or electro-magnetically operated switch 2 while the other end of coil 1 is connected to one terminal of a source of electrical energy, thus forming one part of the auxiliary electrical circuit. The other part of this circuit consists of a conductor or lead 17 electrically connected, at one end, to the solidified weld metal, as at 16, while the other end of lead 17 is connected to the other terminal of the electrical source. The winding 3 of an electromagnet is connected in series with the contacts of the switch or relay 2 across the terminals of the source of electrical energy, that is, in parallel with the above described auxiliary electrical circuit, so that the winding 3 is energized only when the coil 1 is deenergized to close the contacts of switch 2. The energized coil or electromagnet 3 exerts a force actuating the armature 4 of a vibrating mechanism for pouring the flux into a feeding chute 5, from which a pipe leads the flux into the space between welded parts. The feeding chute itself is firmly attached to the welding machine.

When the free end of the probe is in contact with molten slag 12, the auxiliary circuit for energizing coil 1 by way of the leads 17, 18 is closed, through the slag 12 and weld metal 15, and the coil 1 consequently holds the switch 2 in open position, whereby the circuit of the winding 3 is disconnected. As soon as the level of the molten slag sinks below the probe 10, the contact between the probe and the slag 12 is interrupted and the current ceases to flow through the coil 1, so that the switch 2 closes and connects the winding 3 to the source. The winding 3 is now energized and actuates the armature 4 of the flux pouring mechanism, which consequently transports the flux from feeding chute 5 into the pipe which discharges into the welding space. The additional flux causes the slag level to rise until the contact between the probe 10 and the molten slag is restored. Thus, the auxiliary circuit for energizing the coil 1, is again closed, so that the switch 2 opens and interrupts the circuit of electromagnet 3, whereby the pouring of flux into the welding bath is stopped.

The above described device for controlling the molten slag level reliably secures the timely pouring of flux into the welding bath, whereby, in the course of the welding process, the molten slag is maintained up to an appropriate level above the molten weld metal. This device automatically eliminates the occurrence of defects in the welds, which usually occurred with the existing methods of control. Moreover, the invention causes the flux to be automatically poured into the welding bath and consequently maintains the molten slag level at a predetermined position in relation to the molten well metal.

Further, as shown in the drawing, a signal means, for example, in the form of a lamp 19, may be connected in series with the switch 2 so that closing of the contacts of the latter causes energization of lamp 19 which thereby indicates the necessity of supplying flux to the welding space.

Although an illustrative embodiment of the invention has been described in detail herein with reference to the accompanying drawing, it is to be understood that the invention is not restricted to that precise embodiment, and that various changes and modifications may be effected therein without departing from the scope or spirit of the invention, except as defined in the appended claims.

What we claim as new and desire to secure by Letters Patent of the United States is:

1. In an automatic electric welding machine for welding together edges of work pieces which extend at a substantial angle with respect to the horizontal; the combination of a welding assembly moving upwardly along the edges of the work pieces as the welding operation proceeds and including a welding electrode which projects downwardly between the edges of the work pieces and deposits molten weld metal when connected to an electric welding circuit and elements confining the molten weld metal between the edges of the work pieces until the molten weld metal solidifies; means for supplying flux to form a layer of molten slag above the molten weld metal and into which said welding electrode normally depends; and an auxiliary electric circuit independent of the electric welding circuit and including an electrically conductive probe electrically insulated from said upwardly moving welding assembly and mechanically connected to the latter for movement therewith, said probe projecting through one of said elements so as to be disposed a predetermined distance above the level of the molten weld metal and thereby contacted by said molten slag when said layer of the latter has a thickness exceeding a predetermined value, an electrical source, and conductors connecting said source to said probe and the solidified weld metal, respectively, so that the auxiliary circuit is completed through said molten slag and weld metal when said probe is contacted by the slag and the auxiliary circuit is interrupted when the thickness of the layer of molten slag decreases below said predetermined value, and a device operated in response to interruption of the auxiliary electric circuit to sense a dangerous reduction in the thickness of the layer of molten slag covering the welding electrode and the molten weld metal deposited by the latter.

2. In an automatic electric welding machine for welding together edges of work pieces which extend at a substantial angle with respect to the horizontal; the combination as in claim 1, wherein said device operated in response to interruption of the auxiliary electric circuit actuates said means for supplying flux so that the thickness of said layer of molten slag is maintained at approximately said predetermined value.

3. In an automatic electric welding machine for welding together work pieces along edges which are at a substantial angle to the horizontal and define a gap therebetween to receive the weld metal; the combination of side plates spanning said gap at the opposite sides of the work pieces and moving upwardly along said edges as the welding thereof proceeds, a welding electrode moving with said side plates and projecting downwardly therebetween to melt and deposit molten weld metal in said gap when an electric welding current is passed from said electrode to the weld metal which has solidified in said gap, means for supplying flux to said gap to form molten slag which is contained between said side plates above the molten weld metal, a probe fixed with respect to said side plates and electrically insulated from the latter, said probe projecting through one of said side plates into said gap between the side plates for electrical contact with said molten slag when the level of the latter is at least a predetermined distance above the molten weld metal, an auxiliary electric circuit including an electric source probe and the solidified weld metal, respectively, so that said auxiliary circuit is completed through the slag and weld metal when said probe is contacted by the slag and the auxiliary circuit is interrupted when the level of the slag above the molten weld metal falls below said predetermined distance, and a device operated in response to interruption of the auxiliary circuit to sense a decline of the level of the slag below said predetermined distance above the molten weld metal.

4. In an automatic electric welding machine, the combination as in claim 3; wherein said device operated in response to interruption of the auxiliary of the auxiliary electric circuit includes means actuating said means for supplying flux to said gap so that said level of the slag tends to be maintained substantially at said predetermined distance above the molten weld metal.

5. In an automatic electric welding machine, the combination as in claim 3; wherein said auxiliary electric circuit further includes a relay having a coil connected in series with said probe to be energized from said source upon completion of said auxiliary circuit, and contacts which are held open by the enrgized coil and adapted to close upon interruption of said auxiliary circuit, and wherein said device operated in response to interruption of the auxiliary circuit includes a control circuit connected to said electric source in parallel with said auxiliary circuit and having said contacts of the relay interposed in said control circuit so that the latter is energized only when said contacts close.

6. In an automatic electric welding machine, the combination as in claim 5; wherein said control circuit includes a solenoid for operating said means for supplying flux to the gap so that the level of the slag tends to be maintained substantially at said predetermined distance above the molten weld metal.

7. In an automatic electric welding machine, the combination as in claim 5; wherein said device operated in response to interruption of the auxiliary circuit further includes signal means connected to said control circuit for operation in response to energization of the latter.

References Cited in the file of this patent
UNITED STATES PATENTS

| | | |
|---|---|---|
| 2,053,938 | Barker | Sept. 8, 1936 |
| 2,065,634 | Warrick | Dec. 29, 1936 |
| 2,078,479 | Briggs | Apr. 27, 1937 |
| 2,340,093 | White | Jan. 25, 1944 |
| 2,364,645 | Mott et al. | Dec. 12, 1944 |
| 2,443,960 | O'Brien | June 22, 1948 |
| 2,585,607 | Whitmore et al. | Feb. 12, 1952 |
| 2,713,678 | Krokstrand | July 19, 1955 |
| 2,719,896 | Cain | Oct. 4, 1955 |